Feb. 6, 1934.  J. R. HEIDLOFF  1,945,777
METHOD OF ASSEMBLY OF A HOSE END FITTING
Filed Sept. 20, 1930  2 Sheets-Sheet 1
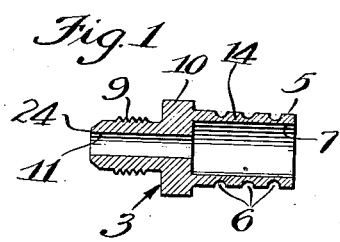
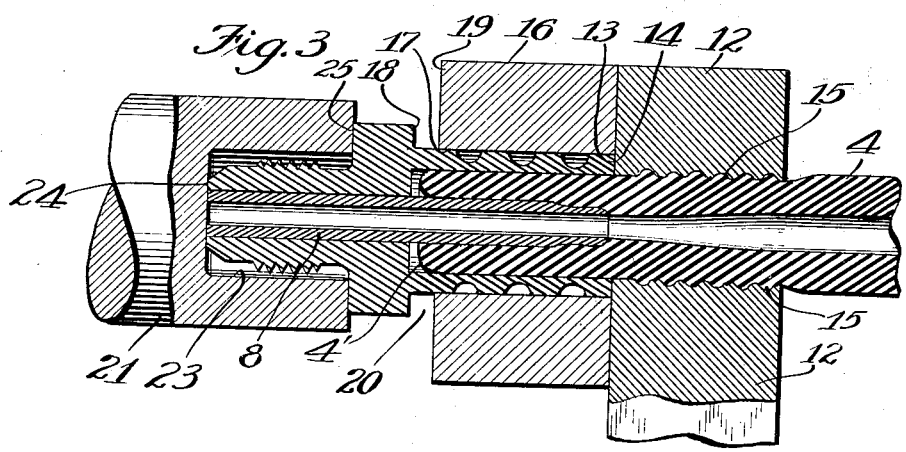
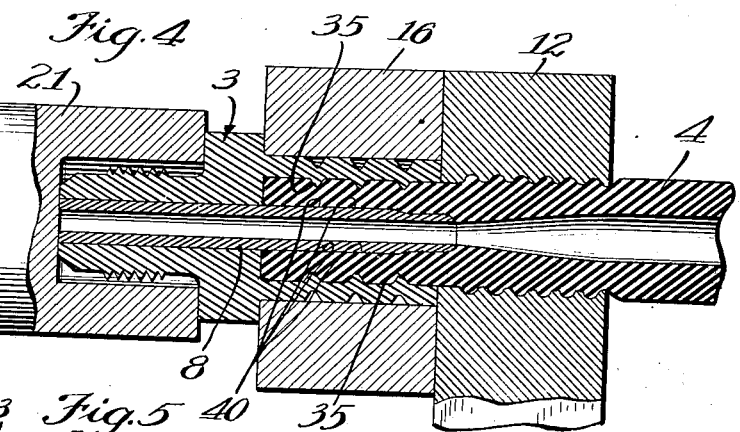
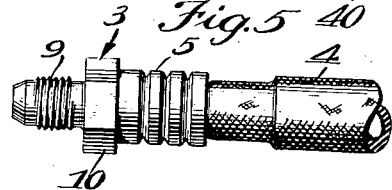
Inventor:
Joseph R. Heidloff
By Williams, Bradbury,
McCaleb & Hinkle
Attys.

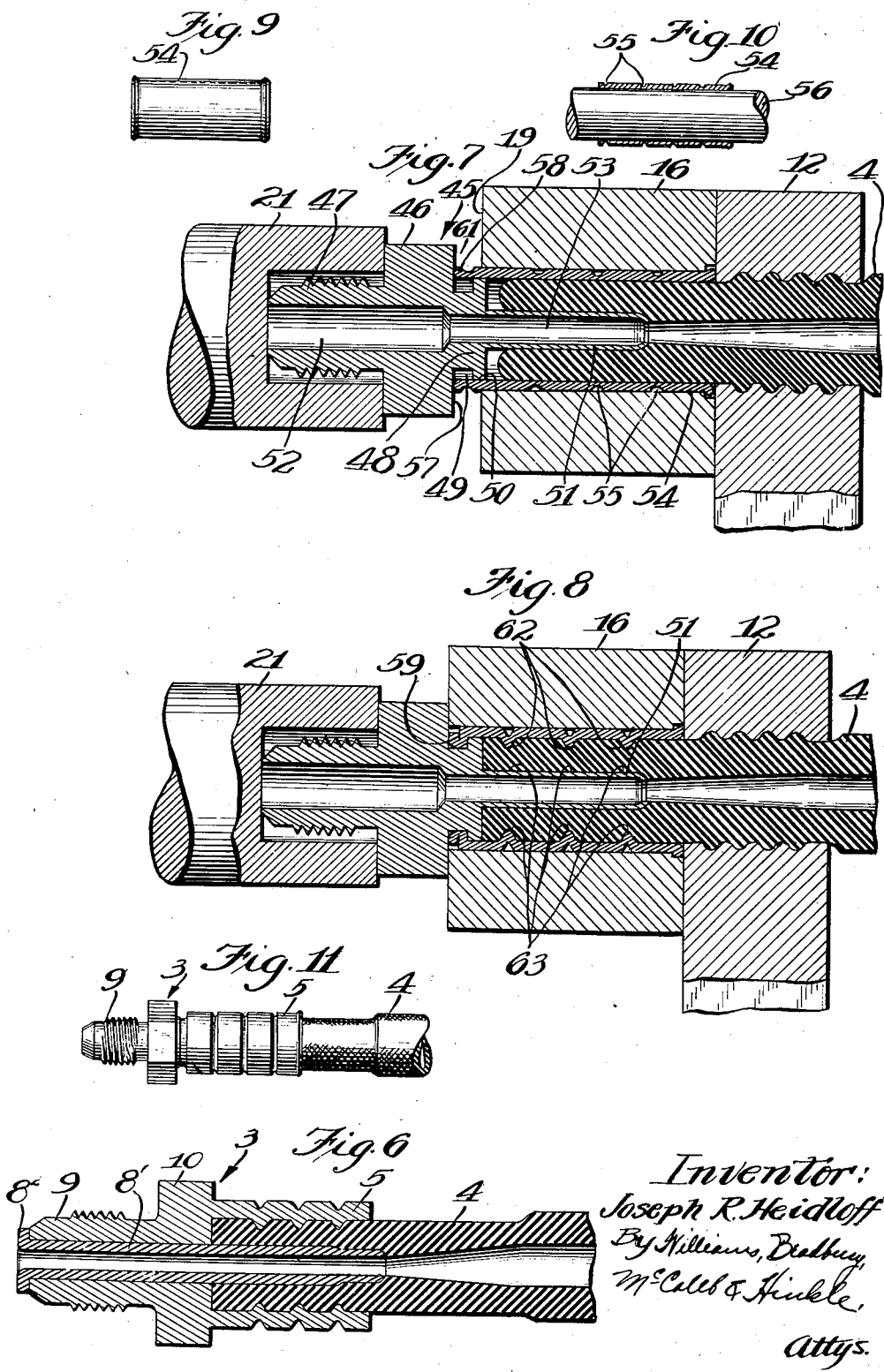

Patented Feb. 6, 1934

1,945,777

UNITED STATES PATENT OFFICE 1,945,777

METHOD OF ASSEMBLY OF A HOSE END FITTING

Joseph R. Heidloff, Detroit, Mich., assignor to Hydraulic Brake Company, Detroit, Mich., a corporation of California Application September 20, 1930
Serial No. 483,209

5 Claims. (Cl. 29—148.2)

This invention relates to hose couplings and particularly to the construction and the method of attaching a coupling to a hose.

Flexible hose is universally used in hydraulic brake systems to interconnect relatively movable parts and comprises a rubber tube having layers of stranded material imbedded therein which renders the hose substantially non-expansible which is most essential.

The fluid pressure developed in a hydraulic braking system, and especially when a sudden stop is necessary, rises to a high degree, and this necessitates the provision of a strong and durable coupler for connecting the hose to the metallic parts of the system, and one of the objects of my invention is to provide an improved hose coupling used in connections of the above type.

A further object is to provide a simple and inexpensively constructed hose coupling consisting of few parts which are easily assembled to provide an improved coupling for high pressure duty.

The structural features of my hose coupling are claimed in my copending application, Serial No. 558,964, filed August 24, 1931.

The above objects and others not particularly pointed out will appear in the following description in connection with the accompanying drawings in which like reference characters in the several views denote like parts and in which Fig. 1 is a medial section of the coupling member of my invention before receiving a hose;

Fig. 2 is a medial section of the nipple which is associated with the coupling assembly;

Fig. 3 is a side elevation in section of an apparatus embodying the invention, showing the apparatus at an intermediate stage of the assembly operation;

Fig. 4 is a view similar to Fig. 3, showing the apparatus at the completion of the assembly operation;

Fig. 5 is a view of the coupling member of my invention secured to a hose;

Fig. 6 is a sectional view of a coupling member similar to that shown in Fig. 4 but in which the nipple extending into the hose is provided with an annular flange overlying the end of the coupling member;

Fig. 7 is a side elevation in section of a modified form of coupling and apparatus for assembling the same at an intermediate stage of the assembly operation;

Fig. 8 is a view similar to Fig. 7, showing the apparatus at the completion of the assembly operation;

Fig. 9 is a view in elevation of the sleeve for interlocking the hose and coupling member in its first form;

Fig. 10 is a view in section of the sleeve for interlocking the hose and coupling member in its final form; and Fig. 11 is a view of the coupling member secured to the hose.

Referring now to the drawings, the apparatus shown in connection with the coupling of my invention illustrates a method of assembling the coupling, indicated generally by the reference character 3, to a high pressure type hose 4 such as is used in hydraulic braking systems.

The coupling 3 of my invention comprises a cylindrical sleeve portion 5 provided with a plurality of annular U-shaped grooves 6 equally spaced along the circumferential face of the same to provide means for securing the coupling 3 to the hose 4 by displacing that portion of the metal or wall in the bottom of the grooves 6 to form an interlock between the coupling 3 and hose 4.

The sleeve portion 5 is provided with an internal bore 7 of slightly smaller diameter than the hose which it is adapted to receive to cause a slight initial compression of the hose 4 when the same is inserted in the bore 7, so that the subsequent insertion of a nipple 8 in the hose 4 causes a further compression of that portion of the hose lying within the bore 7 of the coupling 3.

The coupling 3 has a reduced end portion 9 which is threaded for connecting the coupling to a companion part of a motor vehicle or the like and an intermediate portion 10 preferably hexagonal in shape to facilitate the application of a suitable tool or wrench for threading the coupling to its companion member. A further reduced internal bore 11, extending centrally through the threaded and hexagonal portions 9 and 10, communicates with the bore 7 and is of a size to provide a force fit for the nipple 8 as the same is forced into that portion of the hose 4 extending into the bore 7.

In assembling, the hose 4 which is of slightly larger diameter than the size of the bore 7, is manually inserted therein with its rounded end 4' spaced a short distance from the bottom of the same. A split clamping member 12 is now clamped about the protruding portion of the hose 4 adjacent the sleeve portion 5 with its shoulder 13 abutting against the annular end 14 of the sleeve portion 5. The internal clamping faces of the members 12 are provided with ridges 15 which suitably indent the external wall of the hose 4 to prevent movement of the hose 4 relative to the clamping member 12 during assembly. A split guide member 16 is also provided having a central bore extending therethrough and is of a size to conveniently receive the sleeve portion 5 of the coupling 3.

The guide member 16, when in position, rests against the clamping member 12 and encompasses the major length of the sleeve portion 5 as clearly illustrated in Fig. 3, and serves as a guide and positioning block. The width of the guide member 16 in relation to the length of the sleeve 5 determines the amount that the sleeve 5 may be shortened by the displacement of the metal or wall in the bottom of the annular U-shaped grooves 6 when pressure is applied to the coupling 3 by suitable pressure means. The face 18 of the hexagonal portion 10 is thus spaced a predetermined distance from the end face 19 of the guide member 16 and this space 20 as illustrated in Fig. 3, determines the extent to which the sleeve 5 may be shortened.

With the parts thus assembled as above described, the clamping member is placed upon a suitable supporting means in alignment with a suitable press head 21 which is reciprocated by suitable power means. The nipple 8, the length of which is substantially that of the coupling 3, is provided with a slightly tapered end portion 22 and is then inserted in the bore 11 and the press head 21 moved downwardly into engagement with the exterior end of the nipple to force the same through the bore 11 and into the hose 4.

The press head 21 is provided with an aperture 23, the depth of which is substantially that of the length of the reduced threaded end portion 9 so that as the nipple is forced into place, with its end flush with the end 24 of the coupling 3, the parts will assume the position illustrated in Fig. 3. In this position the threaded end 9 projects into the aperture 23 in the press head 21 with the base of same engaging the annular face 25 of the intermediate hexagonal portion 9.

As the thickness of that portion of the wall in the bottom of the grooves 6 is considerably less than the wall proper of the sleeve portion 5, continued movement of the press head 21 now acting upon the hexagonal portion 10 will cause the metal in the bottom of the U-shaped grooves 6 to be displaced or deformed inwardly under the influence of the force or pressure applied by the press head. This displacement thus produces or forms a plurality of annular V-shaped protuberances 35 which are forced into the outer wall of that portion of the hose 4 extending into the bore 7 of the sleeve portion 5, as clearly illustrated in Fig. 4. The displacement or deforming of that portion of the metal at the bottom of the grooves 6 will necessarily shorten the length of the sleeve portion an amount equal to the width of the gap 20 between respective faces 18 and 19 of the hexagonal portion 10 and the guide member 16, and when the face 18 of the portion 10 engages the end face 19 of the guide member 16 further displacement is prohibited. These annular V-shaped protuberances 35 are thus forced inwardly and firmly embedded in the outer wall of hose 4 to effectually prevent any possibility of the coupling 3 working loose and thus provide for a plurality of annular seals 40 between the internal wall of the hose 4 and the outer wall of the nipple 8 and provide a hose coupling which is not subject to leakage under high pressure.

The reduction in length of the sleeve portion 5, due to the deformation of the metal in the bottom of the grooves 6, also forces the hose 4 into the bore 7, causing the hose end 4' to firmly abut against the bottom of the bore 7. The portion of the nipple 8 extending into the hose 4 serves as a reinforcement to prevent the collapse of the hose during the deforming operation and is substantially a continuation of the interior of the hose connected by the coupling, thereby giving an unrestricted passage for the fluid.

After the coupling 3 is attached to the hose 4, as above described, the clamping member 12 and guide member 16 are removed, the finished product being clearly illustrated in Fig. 5.

The coupling, as illustrated in Fig. 6, is similar to that illustrated in Fig. 4 but is provided with a nipple 8' having an annular end flange $8^2$ which overlies the end of the threaded portion 9 of the coupling member 3. This flange $8^2$ may serve as a gasket where the coupling is connected to a companion part of a motor vehicle or the like.

Referring now to Figs. 7 to 11, inclusive, I illustrate therein a coupling member provided with a modified form of interlock between the coupling member and hose and the method of assembling the same to form a unitary structure.

The coupling member as illustrated and indicated generally by the reference character 45 comprises an intermediate enlargement 46, preferably hexagonal in shape, and a reduced cylindrical portion 47 to the left of the enlargement 46 which is threaded to permit the connection of the coupling member to a companion part of the motor vehicle or the like. The hexagonal enlargement 46 provides for the application of a suitable tool for attaching the coupling member to its companion member.

A reduced portion 48 to the right of the hexagonal enlargement is provided with an annular groove 49 which provides the end of the portion 48 with an annular flange or shoulder 50 which, in combination with the groove 49, is for purposes as will presently be described. The coupling member 45 is also provided with an integrally formed tubular portion extending forward of the portion 48 in the form of a nipple 51 which is adapted for insertion into the hose 4 during the assembly of the coupling 45 and the hose. An entrance bore 52 extending partially through the coupling member 45 communicates with the reduced bore 53 extending through the nipple extension 51 of the same.

A sleeve 54 for securing the coupling member 45 to the hose 4 comprises, as is shown in Fig. 9, a piece of seamless metal tubing such as steel, of predetermined length, which is fabricated to provide in the external wall of the same a plurality of annular U-shaped grooves 55. These U-shaped grooves 55 may be formed in the exterior wall of the sleeve 54 in any suitable manner but preferably by means of a suitable rolling or spinning operation in which the sleeve is supported on a suitable mandrel 56 to prevent the deformation of the internal wall of the same during such forming operation, as clearly illustrated in Fig. 10.

In assembly, the hose to which the coupling member 45 is secured is manually inserted in the sleeve 54 a predetermined distance, causing a slight initial compression of the hose 4 as the external diameter of the hose 4 is slightly larger than the internal diameter of the sleeve 54. A split clamping member and a split guide member, similar to the members 12 and 16 described in connection with Figs. 3 and 4, respectively, clamp the protruding portion of the hose 4 adjacent the sleeve 54 and encompass the major portion of the sleeve 54. The end of the nipple extension 51 of the coupling member 45 may now be inserted in the end of the hose lying within the sleeve 54 and with the parts thus assembled the member 12 is placed upon a suitable supporting plate and the press head 21, as previously described, moved into contacting engagement with the hexagonal enlargement 46.

Pressure exerted against the enlargement 46 by the head 21 forces the nipple 51 into the bore of the hose 4, and continued travel of the coupling member 45 under the influence of the head 21 causes the face 57 of the enlargement 46 to engage the end 58 of the protruding portion of the sleeve 54. The width of the guide member 16 in relation to the length of the sleeve 52 determines the amount that the sleeve may be shortened by the displacement of the metal or wall in the bottom of the annular U-shaped grooves 55 when pressure is applied. The face 57 of the hexagonal portion 46 is thus spaced a predetermined distance from the end face 19 of the guide member 16 when it contacts the end 58 of the sleeve 54 and this space 61, as clearly illustrated in Fig. 7, determines the extent that the sleeve may be shortened.

Further movement of the coupling member 45 under the influence of the press head 21 now causes the metal or wall of the sleeve 54 in the bottom of the annular grooves 55 encompassed by the guide member 18 to be displaced to form a plurality of annular substantially V-shaped protuberances 62 which are forced into the outer wall of the hose 4, as clearly illustrated in Fig. 8, and this displacement continues until the face 57 of the hexagonal enlargement 46 engages the face 19 of the guide member 16. These annular V-shaped protuberances 62 are thus forced inwardly and firmly embedded in the outer wall of the hose 4 to effectually prevent any possibility of the hose working loose. The metal or wall in the bottom of the groove 55 adjacent the end 58 of the protruding portion of the sleeve 54 is also displaced to enter the groove 49 in the portion 48 to the right of the enlargement 46 in the form of an inturned bead 59 which overlies the flange 50, and the bead 59, in combination with the V-shaped protuberances, prevents the coupling member 45 and sleeve 52 working loose. The protuberances 62 thus provide for a plurality of seals 63 between the hose 4 and the outer wall of the nipple extension 51 which extends into the hose 4 and serves as a reinforcement to prevent the collapse of the hose during this deforming operation. The end of the hose 4, due to the reduction in length of the sleeve 54, is forced against the end face of the portion 48, causing the hose to be firmly seated against this face. The coupling in its final form is clearly illustrated in Figs. 8 and 11.

While I have illustrated and described my invention for a particular use, it is to be understood that the coupling of my invention is applicable for other uses, and changes and modifications may be made, but I am to cover all such changes as come within the spirit and scope of the appended claims.

What I claim as new and desire to cover by United States Letters Patent is:

1. The method of assembling a hose coupling comprising the insertion of one end of a hose in a coupling sleeve, inserting a nipple through said coupling sleeve into the bore of the hose, and contracting said sleeve to displace axially spaced portions of said sleeve to firmly embed said displaced portions in the wall of said hose.

2. The method of assembling a hose coupling comprising the insertion of one end of a hose in the bore of a coupling member, inserting a nipple through said coupling sleeve into the bore of the hose and then displacing the bottom portions of annular axially spaced grooves in the sleeve inwardly to embed the same into the wall of the hose.

3. The method of attaching a hose coupling comprising the insertion of a hose end into the end bore of a coupling sleeve, inserting a nipple through said sleeve coupling into the bore of the hose, and then displacing axially spaced portions of the coupling sleeve inwardly for embedment in the wall of said hose, and contracting said sleeve lengthwise to firmly seat the said hose end in the bore, and clamping the same between said sleeve and nipple.

4. The method of assembling a hose coupling comprising the insertion of one end of a hose between a coupling sleeve and a nipple, and contracting said sleeve to displace axially spaced portions of said sleeve to firmly imbed said displaced portions in the wall of said hose.

5. The method of attaching a hose coupling comprising inserting one end of a hose into a coupling sleeve, inserting a nipple into the bore of the hose, and subsequently deforming inwardly the reduced wall portions of annular, axially-spaced grooves in said sleeve to form ridges imbedded in the wall of said hose to interlock said coupling sleeve and said hose.

JOSEPH R. HEIDLOFF.